United States Patent
Rasche et al.

(10) Patent No.: US 9,267,830 B2
(45) Date of Patent: Feb. 23, 2016

(54) HOLDING PART AND CORIOLIS MASS FLOWMETER HAVING A HOLDING PART

(71) Applicant: ABB TECHNOLOGY AG, Zurich (DE)

(72) Inventors: Günter Rasche, Borgentreich (DE); Karl-Heinz Rackebrandt, Adelebsen (DE); Laurenc Wertheim, Göttingen (DE)

(73) Assignee: ABB TECHNOLOGY AG, Zurich (CH)

(*) Notice: Subject to any disclaimer, the term of this patent is extended or adjusted under 35 U.S.C. 154(b) by 149 days.

(21) Appl. No.: 13/852,023

(22) Filed: Mar. 28, 2013

(65) Prior Publication Data

US 2013/0256469 A1 Oct. 3, 2013

(30) Foreign Application Priority Data

Mar. 29, 2012 (DE) .......................... 10 2012 006 256
Feb. 21, 2013 (DE) .......................... 10 2013 002 908

(51) Int. Cl.
*G01F 1/84* (2006.01)
*F16L 3/237* (2006.01)
*F16L 3/22* (2006.01)

(52) U.S. Cl.
CPC .............. *G01F 1/8495* (2013.01); *F16L 3/237* (2013.01); *G01F 1/8413* (2013.01); *G01F 1/8422* (2013.01); *F16L 3/22* (2013.01)

(58) Field of Classification Search
CPC ............. F16L 25/04; F16L 3/237; F16L 3/22; F16L 3/221; F16L 3/273; F01N 13/1805; G01F 1/8495; G01F 1/8413

USPC ................... 248/69, 73; 24/279; 294/87.2; 73/861.355

See application file for complete search history.

(56) References Cited

U.S. PATENT DOCUMENTS

| | | | | |
|---|---|---|---|---|
| 4,114,846 | A * | 9/1978 | Petersen | 248/68.1 |
| 5,172,878 | A * | 12/1992 | Lederman | 248/73 |
| 5,275,061 | A * | 1/1994 | Young et al. | 73/861.357 |
| 6,311,936 | B1 * | 11/2001 | Herr et al. | 248/75 |
| 6,895,826 | B1 * | 5/2005 | Nakao et al. | 73/861.355 |
| 8,590,398 | B2 * | 11/2013 | Lanham et al. | 73/861.355 |
| 2011/0154914 | A1 * | 6/2011 | Hussain et al. | 73/861.355 |
| 2012/0079891 | A1 * | 4/2012 | Hussain et al. | 73/861.357 |
| 2012/0192658 | A1 * | 8/2012 | Hussain et al. | 73/861.357 |
| 2012/0227512 | A1 * | 9/2012 | Jukes | 73/861.357 |
| 2014/0122008 | A1 * | 5/2014 | Dondoshansky et al. | 702/100 |

* cited by examiner

*Primary Examiner* — Anita M King
(74) *Attorney, Agent, or Firm* — Buchanan Ingersoll & Rooney PC

(57) ABSTRACT

A holding part is provided for connecting two pipes running parallel to each other, such as the two parallel measuring pipes of a Coriolis mass flowmeter, at a defined spacing. The holding part includes a first holding ring with a first holding opening for a first pipe, a second holding ring with a second holding opening for a second pipe, and a holding web firmly connecting the two holding rings and defining the spacing between the two holding rings. The holding part also includes a first slot running radially and having a first slot width in the first holding ring, a second slot running radially and having a second slot width in the second holding ring, and a slot width changing device, by actuation of which the first and the second slot width and therefore the diameter of the first and second holding opening can be changed simultaneously.

8 Claims, 2 Drawing Sheets

HOLDING PART AND CORIOLIS MASS FLOWMETER HAVING A HOLDING PART

RELATED APPLICATIONS

This application claims priority under 35 U.S.C. §119 to German Patent Application No. 10 2012 006 256.7 filed in Germany on Mar. 29, 2012, and to German Patent Application No. 10 2013 002 908.2 filed in Germany on Feb. 21, 2013. The entire contents of these applications are hereby incorporated by reference in their entireties.

FIELD

The present disclosure relates to a holding part for connecting two pipes running parallel to each other. More particularly, the present disclosure relates to a holding part for connecting two parallel measuring pipes of a Coriolis mass flowmeter at a defined spacing. The present disclosure also relates to a holding device two or more of the holding parts, and a method of fabricating a Coriolis mass flowmeter having two parallel measuring pipes.

BACKGROUND INFORMATION

In industrial use, it is often necessary to connect a plurality of parts, such as pipes, rods, cable harnesses, etc. to one another. In addition to a simple connection, for example, by means of cable ties or pipe clamps, in specific cases it is also necessary to produce a connection which ensures a defined spacing of the parts from one another and is suitable for further process steps.

In Coriolis flowmeters having two parallel pipes, these not only have to be connected securely to each other but must also have a defined spacing from each other because of the function. The secure connection is generally produced by a holding part, what is known as a gusset plate, which connects the two pipes at a defined point, for example, by means of soldering.

During soldering, in order to achieve a reliable connection, a virtually gap-free connection between gusset plate and pipes is utilized. On account of mechanical tolerances of the holding opening, also called the bore, in the gusset plate and of the external diameter of the pipes, a requisite circumferential gap of, for example, less than 0.1 mm can be achieved only by means of individual adaptation of the individual parts or very close tolerances and is therefore associated with corresponding costs.

SUMMARY

An exemplary embodiment of the present disclosure provides a holding part for connecting two pipes running parallel to each other at a defined spacing. The exemplary holding part includes a first holding ring having a first holding opening for a first pipe, a second holding ring having a second holding opening for a second pipe, and a holding web firmly connecting the first and second holding rings and defining the spacing between the first and second holding rings. The exemplary holding part also includes a first slot running radially and having a first slot width in the first holding ring, and a second slot running radially and having a second slot width in the second holding ring. In addition, the exemplary holding part includes a slot width changing device configured to be actuated to simultaneously change the first and second slot widths and thereby change respective diameters of the first and second holding openings simultaneously.

An exemplary embodiment of the present disclosure provides a method for fabricating a Coriolis mass flowmeter having two parallel measuring pipes, which are connected to each other by means of a holding part and held at a defined spacing from each other. The holding part includes a first holding ring having a first holding opening for a first one of the measuring pipes, a second holding ring having a second holding opening for a second one of the measuring pipes, and a holding web firmly connecting the first and second holding rings and defining the spacing between the first and second holding rings. The holding part also includes a first slot running radially and having a first slot width in the first holding ring, a second slot running radially and having a second slot width in the second holding ring, and a slot width changing device configured to simultaneously change the first and second slot widths and thereby change respective diameters of the first and second holding openings simultaneously. The exemplary method includes attaching the holding part to the two measuring pipes, where a diameter of the first and second holding openings is greater than an external diameter of the measuring pipes. The exemplary method also includes actuating the slot width changing device to reduce the diameter of the first and second holding openings, until the first measuring pipe is clamped firmly in the first holding opening and the second measuring pipe is clamped firmly in the second holding opening, each forming a soldering gap. In addition, the exemplary method includes soldering the holding part to the first and the second measuring pipe along the soldering gaps.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
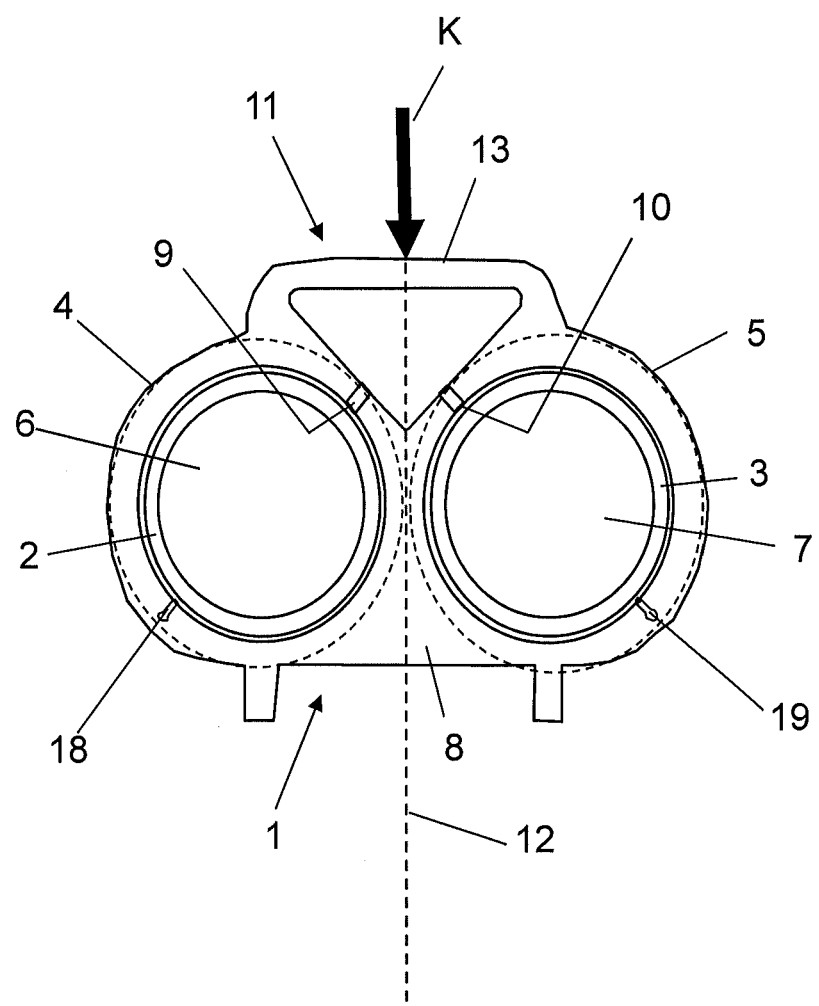
FIG. 1 shows in schematic form a holding part according to an exemplary embodiment of the present disclosure.

Exemplary embodiments of the present disclosure provide a holding part with which the connection of two measuring pipes running parallel to each other at a defined spacing by means of soldering can be produced more simply and inexpensively.

Another exemplary embodiment of the present disclosure provides a method for connecting two measuring pipes running parallel to each other at a defined spacing by means of soldering, and therefore provides a method for fabricating a Coriolis mass flowmeter having two parallel measuring pipes.

An exemplary embodiment of the present disclosure provides a holding part for connecting two pipes running parallel to each other at a defined spacing. The exemplary holding part includes a first holding ring having a first holding opening for a first pipe, a second holding ring having a second holding opening for a second pipe, and a holding web firmly connecting the first and second holding rings and defining the spacing between the first and second holding rings. The exemplary holding part also includes a first slot running radially and having a first slot width in the first holding ring, and a second slot running radially and having a second slot width in the second holding ring. In addition, the exemplary holding part includes a slot width changing device configured to be actuated to simultaneously change the first and second slot widths and thereby change respective diameters of the first and second holding openings simultaneously.

According to an exemplary embodiment of the present disclosure, the holding part can also include a first slot running radially and having a first slot width in the first holding ring, a second slot running radially and having a second slot width in the second holding ring, and a slot width changing device. By actuation of the slot width changing device, the first and second slot widths and therefore the diameter of the first and second holding openings can be changed simultaneously.

According to an exemplary embodiment of the present disclosure, the first and second holding rings and the holding web are arranged in a holding plane, and the first and second holding rings are located opposite each other in relation to the holding web.

According to an exemplary embodiment of the present disclosure, an imaginary plane of symmetry of the holding web runs at right angles to the holding plane. The first and second slots are arranged symmetrically in relation to this plane of symmetry.

According to an exemplary embodiment of the present disclosure, the slot width changing device includes a plastically deformable clamping web.

A holding device according to an exemplary embodiment of the present disclosure includes two such holding parts which, in the direction of the longitudinal extent of the pipes, are spaced apart parallel to each other and connected to each other by a connecting web.

An exemplary embodiment of the present disclosure provides a method for fabricating a Coriolis mass flowmeter having two parallel measuring pipes, which are connected to each other by means of a holding part and held at a defined spacing from each other. The holding part includes a first holding ring having a first holding opening for a first one of the measuring pipes, a second holding ring having a second holding opening for a second one of the measuring pipes, and a holding web firmly connecting the first and second holding rings and defining the spacing between the first and second holding rings. The holding part also includes a first slot running radially and having a first slot width in the first, holding ring, a second slot running radially and having a second slot width in the second holding ring, and a slot width changing device configured to simultaneously change the first and second slot widths and thereby change respective diameters of the first and second holding openings simultaneously. The exemplary method includes attaching the holding part to the two measuring pipes, where a diameter of the first and second holding openings is greater than an external diameter of the measuring pipes. The exemplary method also includes actuating the slot width changing device to reduce the diameter of the first and second holding openings, until the first measuring pipe is clamped firmly in the first holding opening and the second measuring pipe is clamped firmly in the second holding opening, each forming a soldering gap. In addition, the exemplary method includes soldering the holding part to the first and the second measuring pipe along the soldering gaps.

According to the an exemplary embodiment of the present disclosure, the method can also include the steps of: attaching the holding part to the two measuring pipes, where the diameter of the first and second holding openings is greater than the external diameter of the measuring pipes; actuating the slot width changing device to reduce the diameter of the first and second holding openings, until the first measuring pipe is clamped firmly in the first holding opening and the second measuring pipe is clamped firmly in the second holding opening, each forming a soldering gap; and soldering the holding part to the first and the second measuring pipe along the soldering gaps.

According to an exemplary embodiment of the method according to the present disclosure, the holding part is additionally secured to the measuring pipes before the soldering.

According to an exemplary embodiment of the method according to the present disclosure, the additional securing is carried out by stapling.

Exemplary embodiments of the present disclosure are based on the concept of achieving the necessary soldering gap by means of a supplementary process step after the gusset plate and pipes have been led together. To this end, both the external diameters of the pipes and the bores or holding openings can have mechanical tolerances of usual industrial standards, which leads to inexpensive individual part prices.

In order to achieve this, the holding parts or gusset plates may be designed in such a way that the bores or holding openings are not closed, and therefore permit clamping of the pipes. This may be achieved by the gusset plate having a plastically deformable web between the two bores. If the gusset plate is deformed by an external force, the diameter of the bores decreases and the gusset plate clamps the two pipes at a defined spacing. The necessary soldering gap is thus ensured by the clamping.

For the soldering at a specific position, clamping the pipe subassembly is sufficient. Depending on the process steps following the clamping, it may be necessary to secure the parts additionally in order to ensure the positioning accuracy. This can be carried out by appropriate transport devices or by stapling.

In addition to the gusset plates, holding plates for the mounting of exciter and signal sensors are also fixed to the pipes. Holding plates, and also gusset plates, may be fixed in their position by means of arc welding before the soldering.

Coriolis flowmeters are produced in a large nominal width range, which leads to a wide range of the pipe wall thicknesses, for example in the range from <1 mm up to several millimeters.

In addition, different pipe materials are used for resistance reasons.

Both different wall thicknesses and materials require appropriate equipment for fixing by means of arc welding, which leads to high investment.

If the clamping idea is also transferred to the holding plates, a pipe subassembly is obtained which can be produced completely by deforming the gusset and holding plates.

Tolerances which lead to gaps greater than 0.1 mm are avoided by the clamping.

Another advantage is that different materials—such as pipe, gusset/holding plates—can be connected to one another securely and without any structural change in the pipe.

Additional advantageous refinements and aspects of the present disclosure are described in more detail below with reference to the drawings.

The drawings illustrate exemplary embodiments of the present disclosure, and further advantageous refinements and improvements of the exemplary embodiments of the present disclosure will now be explained and described in more detail.

FIG. 1 shows a holding part 1 according to an exemplary embodiment of the present disclosure, designed as what is known as a gusset plate. The gusset plate 1 is a structure produced from a flat metal sheet. Two round holding openings 6, 7 are introduced into the metal sheet. By using the holding openings 6, 7, the gusset plate is pushed onto the two measuring pipes 2, 3 of a Coriolis mass flowmeter which are to be connected, see FIG. 2. The diameter of the holding openings 6, 7 of the gusset plates 1 is chosen such that there is a sufficiently large clearance with respect to the pipe. Both the external diameter of the pipes 2, 3 and the holding openings 6, 7 of the gusset plate 1 are afflicted by tolerances during their production, where the tolerances become greater the more inexpensively they are made. A sufficiently large clearance between the measuring pipe 2, 3 and the holding opening 6, 7 ensures that, even in the case of large production tolerances and correspondingly inexpensive components, the holding part 1 can be pushed easily onto the measuring pipes 2, 3 at the points envisaged. In FIG. 1, it can be seen that there is a distinct gap between the outer side of the measuring pipes 2, 3 and the inner side of the holding openings 6, 7.

In order to fabricate the gusset plate 1, the holding openings 6, 7 can be punched or drilled out of the piece of sheet metal. Therefore, the gusset plate 1 can be divided up functionally into two holding rings 4, 5, which are illustrated as dashed rings in FIG. 1, and a holding web 8 connecting the two holding rings 4, 5. The gusset plate 1 is a flat component. Therefore, the first and second holding rings 4, 5 and the holding web 8 are arranged in a holding plane, and the first and second holding rings 4, 5 are located opposite each other in relation to the holding web 8. An imaginary plane of symmetry 12 of the holding web 8 runs at right angles to the holding plane.

In the first holding ring 4, there is a first slot 9 running radially and having a first slot width. In the second holding ring 5, there is a second slot 10 running radially and having a second slot width. The first and the second slots 9, 10 are arranged symmetrically in relation to the plane of symmetry 12.

The holding part or gusset plate 1 is designed such that the bores or holding openings 6, 7 are not closed and therefore permit clamping of the pipes. This is achieved by the slots 9, 10 dividing the holding rings 4, 5 into two partial arms, an outer and an inner partial arm. The inner partial arm is that which rests on the holding web 8. On the side of the holding ring 4, 5 located opposite the slot, a type of hinge is produced, in order that the two partial arms can be bent towards each other or away from each other. In FIG. 1, this hinge-like action is further reinforced by a notch 18, 19.

In order to be able to move the two partial arms towards each other, the gusset plate 1 has a plastically deformable web 13 between the two bores or holding openings 6, 7. The web 13 is fixed with its two ends in each case to a partial arm of the holding rings 4, 5 that faces away from the holding web 8. If the web 13 is deformed by external force, indicated by the arrow K, the outer partial arm is forced towards the inner partial arm, the diameter of the holding openings 6, 7 decreases and the gusset plate 1 clamps the two pipes 2, 3 at a defined spacing. By means of the clamping, the requisite narrow soldering gap is thus ensured. By means of the web 13, the slot width can therefore be changed, and therefore clamping of the pipe 2, 3 in the holding opening 6, 7 can be achieved. Therefore, the plastically deformable web 13 is to be viewed as an exemplary embodiment of a slot width changing unit. Other exemplary embodiments for such a slot width changing unit are conceivable and can be found by those skilled in the art on the basis of their specialist knowledge.

Figure 2:
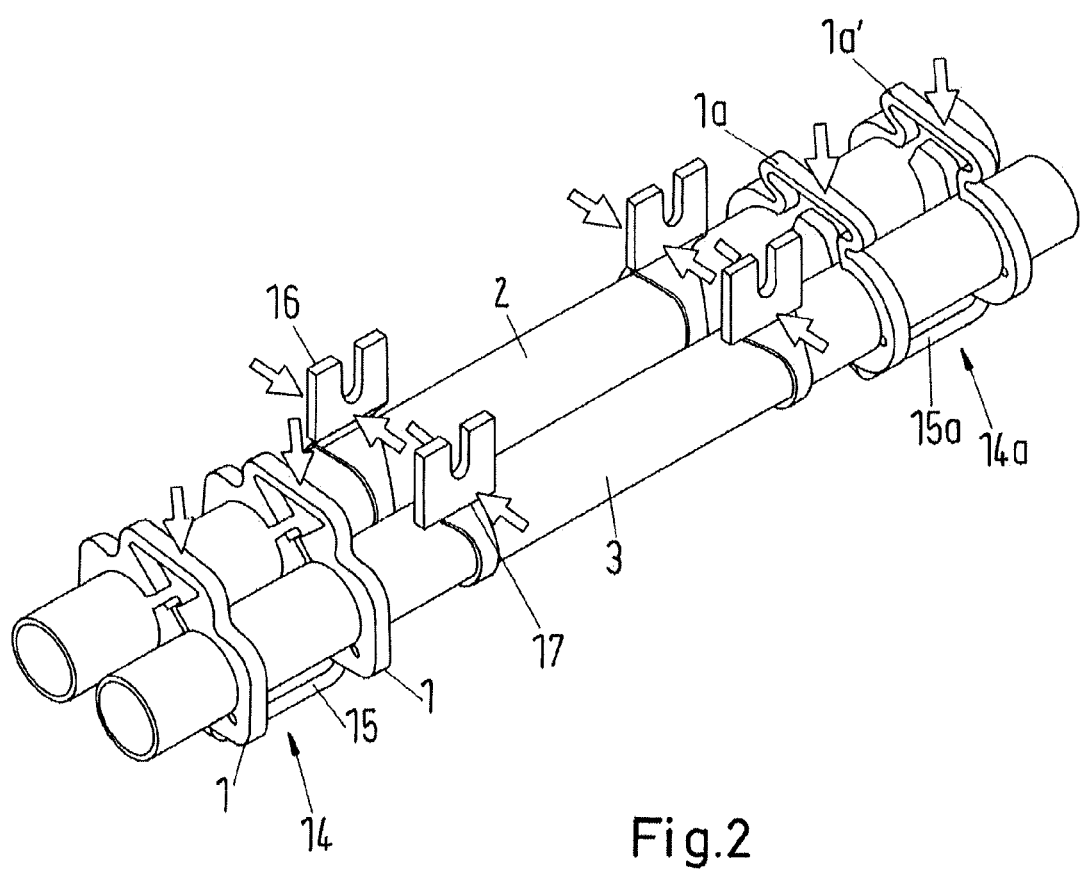
FIG. 2 shows in schematic form the two measuring pipes of a Coriolis mass flowmeter, respectively connected at two points by a holding device according to an exemplary embodiment of the present disclosure, which in each case includes two holding parts according to the present disclosure.

FIG. 2 shows two parallel measuring pipes 2, 3 of a Coriolis mass flowmeter. These are connected to each other by two holding devices 14, 14a. A holding device 14 includes two holding parts 1, 1', both designed as described above, which are spaced apart parallel to each other in the direction of the longitudinal extent of the pipes 2, 3 and are connected to each other by a connecting web 15, 15a.

In addition to the gusset plates 1, 1', 1a, 1a', holding plates 16, 17 for the mounting of exciter and signal sensors are also fixed to the pipes 2, 3.

The idea of clamping has also been transferred to the holding plates 16, 17 in this case. A pipe subassembly is obtained which can be produced completely by deforming the gusset and holding plates.

The present disclosure also covers any desired combinations of exemplary embodiments and individual configuration features or developments, provided these are not mutually exclusive.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Holding part
1' Holding part
1a Holding part
1a' Holding part
2 First pipe
3 Second pipe
4 First holding ring
5 Second holding ring
6 First holding opening
7 Second holding opening
8 Holding web
9 First slot
10 Second slot
11 Slot width changing unit
12 Plane of symmetry
13 Plastically deformable clamping web
14 Holding device
14a Holding device
15 Connecting web
15a Connecting web
16 Holding plate
17 Holding plate
18 Notch
19 Notch

What is claimed is:

1. A holding part for connecting two pipes running parallel to each other at a defined spacing, the holding part comprising:
   a first holding ring having a first holding opening for a first pipe;
   a second holding ring having a second holding opening for a second pipe;
   a holding web firmly connecting the first and second holding rings and defining the spacing between the first and second holding rings;
   a first slot running radially and having a first slot width in the first holding ring;
   a second slot running radially and having a second slot width in the second holding ring;
   a slot width changing device configured to be actuated to simultaneously change the first and second slot widths and thereby change respective diameters of the first and second holding openings simultaneously, wherein the two pipes are parallel measuring pipes of a Coriolis mass flowmeter.

2. The holding part according to claim 1, wherein the first and second holding rings and the holding web are arranged in a holding plane, and the first and second holding rings are located opposite each other in relation to the holding web.

3. The holding part according to claim 2, wherein an imaginary plane of symmetry of the holding web runs at right angles to the holding plane, the first and the second slots being arranged symmetrically in relation to the plane of symmetry.

4. The holding part according to claim 3, wherein the slot width changing device comprises a plastically deformable clamping web.

5. A holding device comprising:
two holding parts according to claim 1, which, in a direction of a longitudinal extent of the pipes, are spaced apart parallel to each other and connected to each other by a connecting web.

6. A holding device comprising:
two holding parts according to claim 2, which, in a direction of a longitudinal extent of the pipes, are spaced apart parallel to each other and connected to each other by a connecting web.

7. A holding device comprising:
two holding parts according to claim 3, which, in a direction of a longitudinal extent of the pipes, are spaced apart parallel to each other and connected to each other by a connecting web.

8. A holding device comprising:
two holding parts according to claim 4, which, in a direction of a longitudinal extent of the pipes, are spaced apart parallel to each other and connected to each other by a connecting web.

\* \* \* \* \*